Murphy & Hook.
Mach. for Making Rubber Hose.
N° 91,476. Patented Jun. 15, 1869

Witnesses
T. S. VanHoevenbergh
Munis Seneuck

Inventor
John Murphy
Albert H. Hook

JOHN MURPHY AND ALBERT H. HOOK, OF NEW YORK, N. Y.

Letters Patent No. 91,476, dated June 15, 1869.

---

IMPROVED MACHINE FOR MAKING RUBBER HOSE, &c.

---

The Schedule referred to in these Letters Patent and making part of the same.

---

Be it known that we, JOHN MURPHY and ALBERT H. HOOK, both of the city, county, and State of New York, have invented a new and useful Machine for Making Rubber Hose, and similar articles; and that the following is a full and clear description thereof, reference being had to the annexed drawings, in which—

Figure 1:
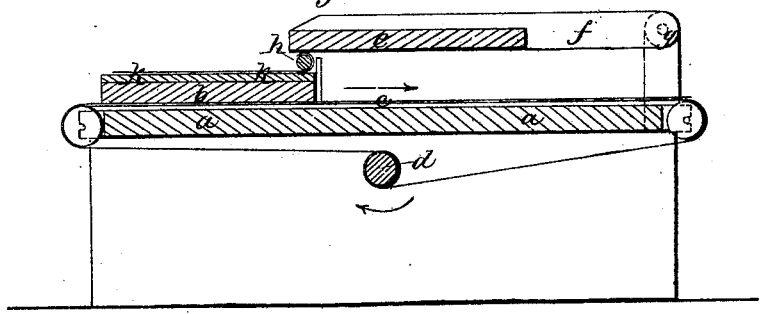
Figure 2:
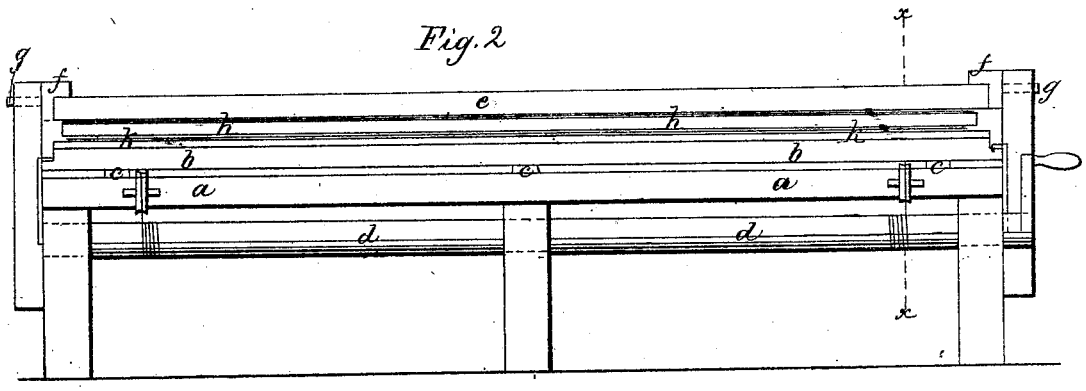

Figure 1 represents a vertical transverse section, on line $x\ x$ of fig. 2.

Figure 2, a front view of the machine.

Rubber hose is made of cloth, coated with rubber.

This cloth is cut bias, and as many pieces thereof jointed together by lap-joints as are required to make the whole length, usually fifty feet, and next, the sheet so made, is wound up laterally on a round mandrel, and the different layers of the cloth made to adhere together by constant rubbing down, which is a very tedious operation.

This winding up the cloth on the mandrel, under pressure, our machine is intended to perform with greater rapidity and certainty than it can be done by hand.

The machine consists of a platform, $a$, upon which a table, $b$, slides, on two or more ways $c$, which are fixed upon the platform.

This table $b$ must be as long or longer than the hose required to be made, and receives a lateral motion, by any convenient mechanism, for instance, by ropes or chains, which wind on and off a shaft, $d$, as shown in the drawings, or by racks and pinions.

$e$ is a plate, furnished with arms $f$, which are pivoted to any convenient point, $g$.

Between this plate $e$ and the table $b$, the mandrel $h$ is to be rolled, the plate bearing upon the mandrel with its weight.

Either the upper surface of the table $b$, or the lower surface of the plate $e$, or both, must be covered with a sheet of rubber, or other elastic material. The drawings show the table $b$ covered with such material at $k$, in order to obtain an even pressure the whole length of the mandrel, and accommodate such pressure to the lap-joints or seams of the rubber cloth.

The operation of the machine is as follows:

The table $b$ is brought back into a position, as shown in fig. 1. The rubber cloth is spread upon it. The mandrel $h$ is placed upon the cloth, near its forward edge, and the edge of the cloth, shown in the drawings by red lines, is made to adhere to the mandrel. The plate $e$, which had been previously hoisted up out of the way, is lowered now upon the mandrel, and its weight permitted to rest thereupon, and finally the table $b$ is moved forward in the direction of the arrow, causing thereby the mandrel to revolve and the cloth to wind up on the said mandrel, after which the hose is done.

Having fully described our invention,

What we claim therein, and desire to secure by Letters Patent, is—

1. A machine for making hose and similar articles, constructed and combined substantially as described.

2. Rolling the mandrel and cloth between two surfaces, one or both of which are covered with elastic materal.

JOHN MURPHY.
ALBERT H. HOOK.

Witnesses:
T. S. VAN HOEVENBERGH,
JUNIUS SCHENCK.